United States Patent Office 3,002,982
Patented Oct. 3, 1961

3,002,982
METHOD OF PREPARING 2-HYDROXYETHYL P-SULFAMYLCARBANILATE
Theodore I. Fand, White Plains, and Bernard F. Duesel, Yonkers, N.Y.; said Duesel assignor to Nepera Chemical Co. Inc., Harriman, N.Y., a corporation of New York
No Drawing. Filed Apr. 8, 1959, Ser. No. 804,859
2 Claims. (Cl. 260—397.7)

This invention relates to a new and novel method of preparing 2-hydroxyethyl p-sulfamylcarbanilate which has the following structure:

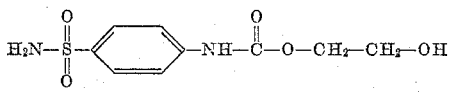

Polyhydroxy alcohol esters of p-sulfamylcarbanilic acid, including 2-hydroxyethyl p-sulfamylcarbanilate, are disclosed in U.S. Patent 2,827,470.

In accordance with one process described in this patent for the preparation of 2-hydroxyethyl p-sulfamylcarbanilate the intermediate p-sulfamylphenyl isocyanate is reacted with ethylene glycol. This method has been found to have some disadvantages especially in large scale production. It is difficult to obtain a clean separation of the 2-hydroxyethyl p-sulfamylcarbanilate formed from the unreacted p-sulfamylphenyl isocyanate and from by-products of the reaction which makes the necessary purification costly.

Since p-sulfamylphenyl isocyanate is obtained by the reaction of sulfanilamide with phosgene stringent safety measures are required because phosgene is a highly toxic gas. In addition, phosgene is a gas at normal atmospheric temperatures so that the reaction of phosgene with sulfanilamide at ordinary temperatures requires large volumes of solvent to maintain the phosgene in solution. To carry out the reaction in the liquid phase low temperatures of the order of 0° C. are necessary. It is apparent that where extensive refrigeration is required production costs will be unduly high. If large volumes of solvent are used it is apparent that the concentration of the desired product in the reaction mixture will be low, and this will require large amounts of heat to vaporize the solvent during the product recovery step.

It is an object of the present invention to provide an efficient and economic method of producing 2-hydroxyethyl p-sulfamylcarbanilate of high purity and in commercially feasible yields.

Another object of the invention is to provide a method for the production of 2-hydroxyethyl p-sulfamylcarbanilate where recovery of the product from the reaction mixture is greatly simplified.

Yet another object of this invention is to provide a method of producing 2-hydroxyethyl p-sulfamylcarbanilate which avoids the use of toxic reactants.

Other objects and the advantages of this invention will become apparent from the following detailed description.

It has now been found that 2-hydroxyethyl p-sulfamylcarbanilate can be obtained efficiently and economically and in high purity by reacting a lower alkyl ester of p-sulfamylcarbanilic acid, for example ethyl p-sulfamylcarbanilate, with an excess of ethylene glycol. We have also found that the recovery of the product from the reaction mixture can be easily effected by the digestion of the reaction mixture with hot water. Following digestion of the reaction mixture with hot water, the unreacted intermediate is readily removed by filtration of the aqueous slurry formed. The filtrate upon cooling yields pure crystals of 2-hydroxyethyl p-sulfamylcarbanilate.

It has been found that the extent of the reaction may be followed readily by merely measuring the volume of the lower alkyl alcohol formed in the reaction. This affords a convenient means of determining whether the reaction has proceeded to the desired degree of completion.

Any lower alkyl ester of p-sulfamylcarbanilic acid may be reacted with ethylene glycol in accordance with this invention to form the desired 2-hydroxyethyl p-sulfamylcarbanilate. "Lower alkyl" as used herein indicates branched or straight chain aliphatic groups having not more than 6 carbon atoms, including methyl, ethyl, n-propyl, isopropyl, n-butyl, n-amyl, n-hexyl and the like. Ethyl p-sulfamylcarbanilate is a preferred starting material in the method of this invention.

The lower alkyl esters of p-sulfamylcarbanilic acid may be prepared, for example by the method disclosed by Adams et al. in J.A.C.S. 61, 2342–2346 (1939) which describes the preparation of ethyl p-sulfamylcarbanilate by the reaction of ethyl carbanilate with chlorosulfonic acid followed by reaction with ammonia.

In the reaction of a lower alkyl ester of p-sulfamylcarbanilic acid with ethylene glycol in accordance with this invention, it is desirable that the ethylene glycol be present in the reaction mixture in excess, and the best results are obtained where the molar ratio of ethylene glycol to the lower alkyl p-sulfamylcarbanilate is about 2 to 1 to about 8 to 1.

The reaction is preferably carried out under partial reflux, the vapors formed being removed, partially condensed and the condensate returned to the reaction vessel as reflux. In the course of the reaction, a lower alkyl alcohol corresponding to the particular lower alkyl ester of p-sulfamylcarbanilic acid is formed. Where the preferred ethyl p-sulfamylcarbanilate is reacted with ethylene glycol, it is ethyl alcohol which is formed during the reaction. Since the lower alkyl alcohol formed has an appreciably lower boiling point than ethylene glycol, which not only constitutes one of the reactants but is also the solvent in the reaction mixture, it is apparent that the temperature at which the reaction mixture boils will progressively decrease during the course of the reaction if the concentration of the lower alkyl alcohol formed is permitted to build up. It is, accordingly, a particular feature of this invention that the lower alkyl alcohol is removed from the reaction mixture as fast as it is formed. This is conveniently accomplished by the partial condensation of the vapors leaving the reaction vessel as described above.

The vapors leaving the reaction vessel comprise a mixture of ethylene glycol and the lower alkyl alcohol formed during the reaction. The temperature of partial condensation is adjusted so that the ethylene glycol in the vapors condense, but as much as possible of the lower alkyl alcohol remains in the vapor phase. The condensate rich in ethylene glycol is returned to the reaction vessel as reflux, the vapors rich in lower alkyl alcohol are cooled further to condense the lower alkyl alcohol therefrom, and this final condensate is withdrawn.

The removal of the lower alkyl alcohol formed in the reaction is desirable not only as an aid in controlling the reaction temperature and avoiding the necessity of constantly increasing the pressure in the reaction vessel to compensate for the boiling point temperature of the reaction mixture which would progressively decrease if the lower alkyl alcohol is allowed to accumulate in the reaction mixture, but has other significant advantages. By removing the lower alkyl alcohol, which is one of the products of the reaction, it is apparent that the equilibrium of the reaction will be shifted favorably in the direction of the formation of the desired product 2-hydroxyethyl p-sulfamylcarbanilate. This augments the favorable equilibrium shift which is obtained through use of a substantial excess of ethylene glycol. In addition, the removal of the lower alkyl alcohol forms a convenient means for following the course of the reaction. The alcohol formed can be continuously measured and the accumulated volume represents a measure of the conversion of the lower alkyl p-sulfamylcarbanilate in the reaction mixture. Since the rate of an organic reaction is frequently influenced to a large degree by the presence of trace impurities in the materials reacted, it becomes difficult to be sure that a reaction after a definite length of time at a known temperature has proceeded to a desired degree of completion. This expedient affords an easy way of following the course of the reaction and thus represents a substantial advantage particularly in commercial operation.

The temperature at which the reaction is carried out in accordance with this invention is normally in the range of about 150 to about 200° C. and preferably in the range of 175 to 195° C. The reaction temperature may be controlled by adjusting the temperature of the overhead partial condenser. If the condensation temperature is lowered the condensate returned as reflux will have a higher proportion of alcohol in the ethylene glycol, and as a result the boiling point temperature of the reaction mixture falls. Alternately, minor adjustment in the pressure maintained in the reaction vessel may be made. For example, if the reaction is carried out under a slight vacuum the reaction temperature is reduced.

The reaction time is normally in the range of from about 2 hours to about 10 hours with the particular time selected being governed by the desired degree of conversion, which may be conveniently determined by measuring the volume of lower alkyl alcohol formed in the reaction as described above.

The separation of the finished product from the unreacted lower alkyl ester is conveniently carried out by digesting the contents of the reaction vessel with hot water at the conclusion of the reaction. The unreacted lower alkyl ester of p-sulfamylcarbanilic acid is insoluble in hot water and thus can be separated by filtration of the aqueous mixture obtained on digestion. For the optimum degree of separation of the unreacted lower alkyl ester of p-sulfamylcarbanilic acid from 2-hydroxyethyl p-sulfamylcarbanilate the aqueous mixture is filtered at a temperature between about 70 and about 90° C. After removal of the insoluble precipitate, which constitutes the unreacted lower alkyl ester, the resulting solution may be cooled, whereupon 2-hydroxyethyl p-sulfamylcarbanilate, separates as a white crystalline solid. For further purification the product may be recrystallized from hot water.

Prior to the digestion of the reaction mass with hot water the mass may be heated under vacuum to recover portions of the unreacted ethylene glycol. This step may be desirable for optimum utilization of raw materials in the process, and in addition, tends to improve the recovery of the finished product after hot water digestion.

It is possible, if desired, to employ a catalyst such as p-toluenesulfonic acid, phosphoric acid and the like in the reaction of the lower alkyl p-sulfamylcarbanilate with ethylene glycol.

The following examples are given in order to further illustrate the method of the present invention:

*Example I*

A quantity of 75 grams of ethyl p-sulfamylcarbanilate was added to 41.6 grams of ethylene glycol and the mixture was heated for 6 hours with constant stirring at a temperature ranging from 179° C. to 194° C. The molar ratio of the reactants is 2.2 mols ethylene glycol to 1 mol ethyl p-sulfamylcarbanilate. The reaction was carried out at normal atmospheric pressure. During the course of the reaction vapors were continuously withdrawn from the reaction vessel, partially condensed, and the resulting condensate consisting primarily of ethylene glycol was returned as reflux to the reaction vessel. The remaining vapors consisting essentially of ethyl alcohol formed during the course of the reaction were totally condensed and withdrawn. At the conclusion of the 6 hours reaction time, the reaction mixture was digested with 750 ml. hot water and filtered at 75° C. The solids recovered weighed 42 grams and consisted of unreacted ethyl p-sulfamylcarbanilate. The filtrate was cooled to yield a white semi-crystalline solid which was further purified by recrystallization from hot water. The final crystals consisting of 2-hydroxyethyl p-sulfamylcarbanilate weighed 24.2 grams, representing a yield based on the reacted ethyl p-sulfamylcarbanilate of 69 percent. The conversion based on the ethyl p-sulfamylcarbanilate reacted was 44 percent. The unreacted ethyl p-sulfamylcarbanilate recovered by filtration of the hot water digested reaction mixture may be recycled for reaction with ethylene glycol for further production of 2-hydroxyethyl p-sulfamylcarbanilate.

*Example II*

A quantity of 100 grams of ethyl p-sulfamylcarbanilate was added to 152.5 grams of ethylene glycol in a reaction vessel. The molar ratio of the reactants is 6 mols ethylene glycol to 1 mol ethyl p-sulfamylcarbanilate. A slight vacuum was applied to the reaction vessel and the mixture was heated for 2½ hours at 176° C. to 180° C. During the reaction the vapors were withdrawn from the reaction vessel, partially condensed, the ethylene glycol condensate returned to the reaction vessel as reflux, and the remaining vapors constituting primarily ethyl alcohol were totally condensed and withdrawn. The final condensate constituted 18 ml. of ethyl alcohol at the end of 2½ hours. The pressure in the reaction vessel was reduced to 20 millimeters and 30 ml. ethylene glycol distilled over. The residue in the reaction vessel was digested hot in 1 liter of water, and the insoluble portion, constituting 8 grams of unreacted ethyl p-sulfamylcarbanilate, was removed by filtration at a temperature of 75° C. The filtrate was cooled to form a white crystalline solid which was redissolved in hot water in the presence of charcoal. The solution was filtered at a temperature of 70° C. and the filtrate was cooled to yield 76 grams of white crystalline 2-hydroxyethyl p-sulfamylcarbanilate. The conversion of the ethyl p-sulfamylcarbanilate in the reaction is 92 percent based on either the amount of unreacted ethyl p-sulfamylcarbanilate recovered after the hot water digestion of the reaction mixture or the amount of ethyl alcohol formed during the reaction. The yield of 2-hydroxyethyl p-sulfamylcarbanilate is 71 percent based on the amount of ethyl p-sulfamylcarbanilate reacted. The recovered unreacted ester may be further reacted with ethylene glycol to augment the over-all recovery of 2-hydroxyethyl p-sulfamylcarbanilate.

The foregoing example illustrates a particular advantage of the method of the present invention, in that the progress of the reaction may be continuously followed by measuring the volume of lower alkyl alcohol formed during the reaction. It is noted that the conversion of ethyl p-sulfamylcarbanilate in the reaction described in Example 2 is 92 percent, whether calculated from the amount of unreacted ester recovered at the end of the reaction, or from the amount of ethyl alcohol formed. This illustrates that measurement of the volume of the ethyl alcohol condensate recovered affords a true and accurate measurement of the extent of the reaction.

It is understood that the foregoing detailed description is given merely by way of illustration and that many variations may be made therein without departing from the spirit of our invention.

Having described our invention, what we desire to secure by Letters Patent is:

We claim:

1. In a method of preparing 2-hydroxyethyl p-sulfamylcarbanilate, the steps which comprise refluxing a mixture of a lower alkyl ester of p-sulfamylcarbanilic acid with ethylene glycol at a temperature between about 150° C. and about 200° C. for about 2 to about 10 hours, the molar ratio of ethylene glycol to said lower alkyl ester of p-sulfamylcarbanilic acid in said mixture being between about 2 to 1 and about 8 to 1, continuously withdrawing and partially condensing the vapor phase of said reaction at a temperature above the boiling point of the lower alkyl alcohol formed as a product of the reaction whereby a partial condensate rich in ethylene glycol is formed and returned to said reaction mixture, digesting the reaction mixture with hot water so that only the 2-hydroxyethyl p-sulfamylcarbanilate formed is dissolved, filtering the resulting suspension at a temperature between about 70° C. and about 90° C. thereby to separate the undissolved lower alkyl ester of p-sulfamylcarbanilic acid and crystallizing 2-hydroxyethyl p-sulfamylcarbanilate from the aqueous filtrate by cooling.

2. A method according to claim 1 wherein said lower alkyl ester of p-sulfamylcarbanilic acid is ethyl p-sulfamylcarbanilate, and wherein the reaction is carried at a temperature between 175° C. and about 195° C.

References Cited in the file of this patent

UNITED STATES PATENTS

| | | |
|---|---|---|
| 2,827,410 | Meyers | Mar. 18, 1958 |
| 2,862,957 | Siggel et al. | Dec. 2, 1958 |
| 2,891,929 | Caldwell et al. | June 23, 1959 |

OTHER REFERENCES

Noller: Chemistry of Organic Compounds, W. B. Saunders Co., Philadelphia, pages 170–171 (1951).

Groggins: Unit Processes in Organic Synthesis, McGraw-Hill, N.Y. pages 734–736 (1958).